US010267692B2

(12) United States Patent
Son

(10) Patent No.: US 10,267,692 B2
(45) Date of Patent: Apr. 23, 2019

(54) TORQUE SENSING APPARATUS HAVING A TWO PART HOUSING ARRANGEMENT AND A PLURALITY OF PROTRUSIONS ON THE STATOR HOLDER ARRANGED IN BETWEEN

(71) Applicant: LG INNOTEK CO., LTD., Seoul (KR)

(72) Inventor: Ho Chan Son, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 15/025,503

(22) PCT Filed: Sep. 2, 2014

(86) PCT No.: PCT/KR2014/008209
§ 371 (c)(1),
(2) Date: Mar. 28, 2016

(87) PCT Pub. No.: WO2015/046771
PCT Pub. Date: Apr. 2, 2015

(65) Prior Publication Data
US 2016/0238471 A1   Aug. 18, 2016

(30) Foreign Application Priority Data
Sep. 27, 2013 (KR) .................. 10-2013-0115020

(51) Int. Cl.
*G01L 3/10* (2006.01)
*B62D 6/10* (2006.01)

(52) U.S. Cl.
CPC .............. *G01L 3/101* (2013.01); *B62D 6/10* (2013.01); *G01L 3/104* (2013.01)

(58) Field of Classification Search
CPC .................................................. G01L 3/104
See application file for complete search history.

(56) References Cited

U.S. PATENT DOCUMENTS 4,381,465 A * 4/1983 Renkl .................. H02K 19/06
310/257
4,578,608 A * 3/1986 Mech .................. H02K 5/132
310/112

(Continued)

FOREIGN PATENT DOCUMENTS

CN       101836097 A    9/2010
CN       102822038 A    12/2012

(Continued)

OTHER PUBLICATIONS

Extended European Search Report dated Oct. 7, 2016 in European Application No. 14848349.8.

(Continued)

*Primary Examiner* — Harshad R Patel
*Assistant Examiner* — Tran M. Tran
(74) *Attorney, Agent, or Firm* — Saliwanchik, Lloyd & Eisenschenk

(57) ABSTRACT

A torque sensing apparatus comprises: a first casing comprising a first opening; a second casing comprising a second opening; a stator comprising a stator holder that is placed in the interior of the first casing and the second casing and at least one stator tooth that is secured to the stator holder; and a rotor that is rotatably disposed in the stator, wherein the stator comprises a protrusion facing the inner peripheral surface of the first opening.

8 Claims, 5 Drawing Sheets

(56) References Cited

U.S. PATENT DOCUMENTS

| | | | | |
|---|---|---|---|---|
| 4,716,648 | A * | 1/1988 | Nel | H02K 1/185 |
| | | | | 29/596 |
| 5,274,292 | A * | 12/1993 | Lemmer | H01R 39/08 |
| | | | | 29/597 |
| 5,382,172 | A * | 1/1995 | Klier | B60R 16/027 |
| | | | | 439/15 |
| 6,367,337 | B1 * | 4/2002 | Schlabach | B62D 6/10 |
| | | | | 180/443 |
| 6,410,909 | B1 * | 6/2002 | Rudolph | B62D 15/02 |
| | | | | 250/231.13 |
| 7,021,160 | B2 * | 4/2006 | Pattok | G01L 3/101 |
| | | | | 73/862.332 |
| 7,091,474 | B2 * | 8/2006 | Sano | G01D 5/04 |
| | | | | 250/231.13 |
| 7,174,795 | B2 * | 2/2007 | Feng | G01D 5/145 |
| | | | | 73/862.331 |
| 7,231,837 | B2 * | 6/2007 | McCoy, Jr. | G01D 5/145 |
| | | | | 324/207.2 |
| 7,363,825 | B2 * | 4/2008 | Feng | G01L 3/104 |
| | | | | 73/862.325 |
| 7,774,945 | B2 * | 8/2010 | Sano | G01D 11/245 |
| | | | | 33/1 PT |
| 8,040,013 | B2 * | 10/2011 | Parmeter | E21B 43/128 |
| | | | | 310/216.129 |
| 8,375,810 | B2 * | 2/2013 | Bae | G01L 3/10 |
| | | | | 73/862.334 |
| 8,397,588 | B2 * | 3/2013 | Kang | G01B 7/30 |
| | | | | 73/862.08 |
| 8,448,528 | B2 * | 5/2013 | McDonald | G01L 3/104 |
| | | | | 73/862.331 |
| 8,561,306 | B2 * | 10/2013 | Busse-Grawitz | G01D 11/30 |
| | | | | 264/272.11 |
| 8,590,370 | B2 * | 11/2013 | Lee | B62D 6/10 |
| | | | | 73/117.02 |
| 8,813,578 | B2 * | 8/2014 | Kaess | B62D 6/10 |
| | | | | 324/207.2 |
| 9,331,529 | B2 * | 5/2016 | Yamamoto | H02K 1/145 |
| 9,356,500 | B2 * | 5/2016 | Furlan | H02K 7/06 |
| 9,389,148 | B2 * | 7/2016 | Lee | B62D 6/10 |
| 9,434,410 | B2 * | 9/2016 | Lee | B62D 6/10 |
| 9,464,954 | B2 * | 10/2016 | Kim | F16B 21/16 |
| 9,702,776 | B2 * | 7/2017 | Schoepe | G01L 5/22 |
| 2006/0272430 | A1 * | 12/2006 | Araki | B60R 16/027 |
| | | | | 73/862.321 |
| 2006/0283271 | A1 * | 12/2006 | Araki | B60R 16/027 |
| | | | | 73/866.5 |
| 2012/0297916 | A1 | 11/2012 | Lee | |
| 2016/0146634 | A1 * | 5/2016 | Elpermann | B60R 16/027 |
| | | | | 324/207.15 |

FOREIGN PATENT DOCUMENTS

| | | |
|---|---|---|
| EP | 2295310 A2 | 3/2011 |
| EP | 2434259 A2 | 3/2012 |
| JP | 2006335318 A | 12/2006 |
| KR | 20060127798 A | 12/2006 |
| KR | 1020090004289 A | 1/2009 |
| KR | 20100006435 U | 6/2010 |
| KR | 2020100006367 U | 6/2010 |
| KR | 1020110109100 A | 10/2011 |
| KR | 1020120069870 A | 6/2012 |
| KR | 101236580 B1 | 2/2013 |

OTHER PUBLICATIONS

International Search Report in International Application No. PCT/KR2014/008209, filed Sep. 2, 2014.

Office Action dated May 27, 2017 in Chinese Application No. 201480052397.7, along with its English translation.

* cited by examiner

TORQUE SENSING APPARATUS HAVING A TWO PART HOUSING ARRANGEMENT AND A PLURALITY OF PROTRUSIONS ON THE STATOR HOLDER ARRANGED IN BETWEEN

CROSS-REFERENCE TO RELATED APPLICATION

This application is the U.S. national stage application of International Patent Application No. PCT/KR2014/008209, filed Sep. 2, 2014, which claims priority to Korean Application No. 10-2013-0115020, filed Sep. 27, 2013, the disclosures of each of which are incorporated herein by reference in their entirety.

FIELD

The present invention relates to a torque sensor, and more particularly, to a torque sensor mounted on vehicles to measure a torque about a steering axis.

BACKGROUND

Generally, an electronic power steering system (EPS) is an apparatus for ensuring steering stability of a vehicle and provides a torque in the direction that a driver steers using a motor for smooth handling.

Unlike the existing hydraulic power steering (HPS), the EPS may improve steering performance and steering feel by controlling an operation of a motor according to driving condition.

A torque load about a steering axis, a steering angle, and an angular velocity of steering need to be measured for the EPS to provide an appropriate torque.

A conventional steering structure includes an input axis coupled with a steering wheel, an output axis joined with a pinion which is coupled to a rack bar at a wheel and a torsion bar which connects the input axis and the output axis.

When a steering wheel is rotated, rotation power is delivered to the output axis and directions of wheels are changed by the operation of a pinion and a rack bar. Here, when a resistance force is great, the input axis becomes more rotated so that the torsion bar becomes twisted, and a magnetic field type torque sensor measures the degree of twist of the torsion bar.

The torque sensor is provided to be accommodated in an upper casing and a lower casing with a rotor, a stator, a collector and a circuit board, and the torque sensor provided as such is accommodated in a housing to connect with the input axis and the output axis. Here, a stator holder is fixed in the axis direction by coupling the upper casing and the lower casing.

However, there is a problem in that the stator holder vibrates in a case in the case of not being fixed in a direction perpendicular to the axis direction, i.e. the horizontal direction. When the stator holder vibrates as such, a gap of the stator tooth delivering a magnetic force is changed, and thus there is a problem in that reliability of the torque sensor operation is lowered.

DISCLOSURE

Technical Problem

The present invention provides a torque sensor where reliability of a torque sensor operation is improved by preventing a stator from vibrating in a lateral direction perpendicular to an axis direction.

Technical Solution

According to an aspect of the present invention, a torque sensor includes a first casing including a first opening, a second casing including a second opening, a stator including a stator holder disposed inside the first casing and the second casing and at least a stator tooth fixed to the stator holder, and a rotor rotatably disposed in the stator wherein the stator includes a protrusion facing an inner peripheral surface of the first opening.

In the torque sensor according to an aspect of the present invention, a diameter of the first opening may be greater than that of the second opening.

In the torque sensor according to an aspect of the present invention, the protrusion may be formed in a plurality of numbers along a first virtual circle, and a diameter of the first virtual circle may be equal to or smaller than that of the first opening.

In the torque sensor according to an aspect of the present invention, the diameter of the first opening may be greater than that of an outer peripheral surface of the rotor.

In the torque sensor according to the aspect of the present invention, the diameter of the first virtual circle may be greater than that of an outer peripheral surface of the rotor.

In the torque sensor according to an aspect of the present invention, a diameter of an outer peripheral surface of the stator may be greater than those of the first opening and the first virtual circle.

In the torque sensor according to an aspect of the present invention, the protrusion may protrude from the stator tooth in an axis direction.

In the torque sensor according to an aspect of the present invention, the protrusion may protrude from the stator holder in an axis direction.

In the torque sensor according to an aspect of the present invention, the torque sensor may include a collector connected to the stator tooth, and a magnetic device configured to detect a magnetization level collected by the collector.

According to another aspect of the present invention, a torque sensor includes a first casing in which a first opening is formed, a second casing in which a second opening is formed, a stator including a stator holder disposed inside the first casing and the second casing and at least a stator tooth fixed to the stator holder, and a rotor rotatably disposed in the stator, wherein the first casing includes a first guide groove formed inside thereof, and the stator includes a first protrusion rotatably coupled to the first guide groove.

In the torque sensor according to another aspect of the present invention, the protrusion may be formed in a plurality of numbers along a first virtual circle, and a diameter of the first virtual circle may be greater than that of the first opening.

In the torque sensor according to another aspect of the present invention, the first protrusion may protrude from the stator holder in an axis direction.

In the torque sensor according to another aspect of the present invention, the second casing may include a second guide groove formed inside thereof, and the stator may include a second protrusion rotatably coupled to the second guide groove.

In the torque sensor according to another aspect of the present invention, the torque sensor may include a collector connected to the stator tooth, and a magnetic device configured to detect a magnetization level collected by the collector.

According to still another aspect of the present invention, a torque sensor includes a first casing in which a first opening is formed, a second casing in which a second opening is formed, a stator including a stator holder disposed inside the first casing and the second casing and at least a stator tooth fixed to the stator holder, and a rotor rotatably disposed in the stator, wherein the stator includes a first protrusion which protrudes in an axis direction to face an inner peripheral surface of a first opening, and a second protrusion rotatably coupled to a guide groove formed in the second casing.

Advantageous Effects

According to an embodiment of the present invention, a stator can be prevented from vibrating in a case in a lateral direction perpendicular to an axis direction, and thus reliability of the torque sensor operation can be improved.

DETAILED DESCRIPTION

Figure 1:
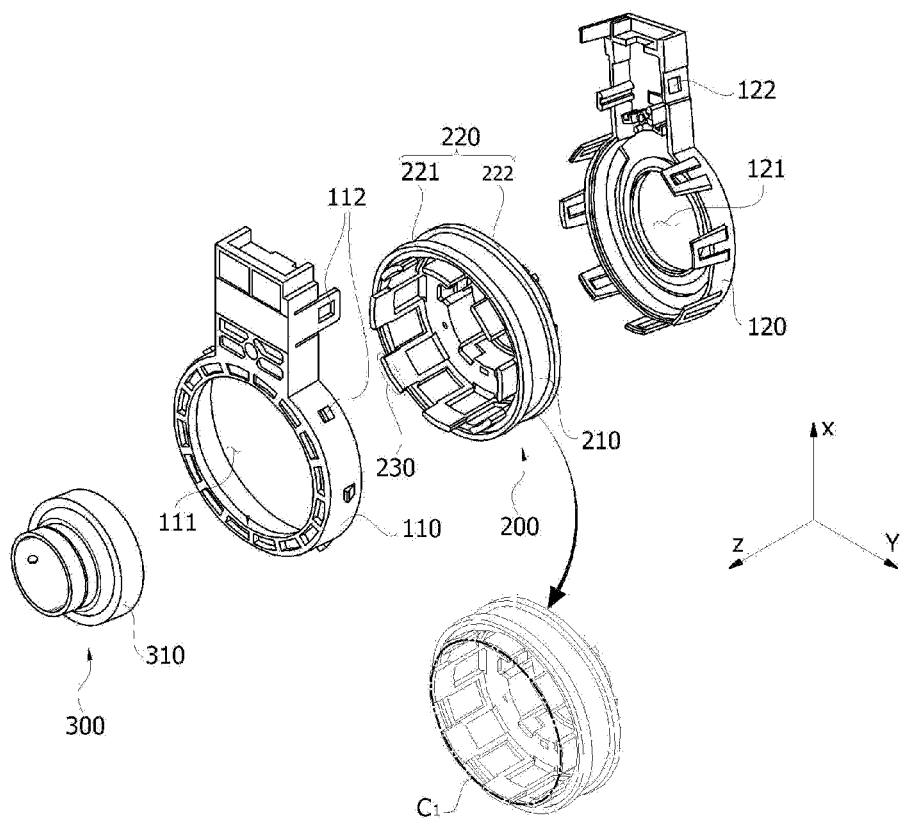
FIG. 1 is an exploded perspective view of a torque sensor according to an embodiment of the present invention.

While the present invention is susceptible to various modifications and alternative embodiments, specific embodiments thereof are shown by way of examples in the drawings and described. However, it should be understood that there is no intention to limit the present invention to the particular embodiments disclosed, but on the contrary, the present invention is to cover all modifications, equivalents, and alternatives falling within the spirit and scope of the invention.

It will be understood that, although the terms including ordinal numbers such as "first," "second," etc. may be used herein to describe various elements, these elements are not limited by these terms. These terms are only used to distinguish one element from another. For example, a second element could be termed a first element without departing from the teachings of the present inventive concept, and similarly a first element could be also termed a second element. The term "and/or" includes any and all combination of one or more of the associated listed items.

It will be understood that when an element or layer is referred to as being "on," "connected to," or "coupled with" another element or layer, it can be directly on, connected, or coupled to the other element or layer or intervening elements or layers may be present. In contrast, when an element is referred to as being "directly on," "directly connected to," or "directly coupled with" another element or layer, there are no intervening elements or layers present.

The terminology used herein is for the purpose of describing particular embodiments only and is not intended to be limiting of the present invention. As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present invention will be described in detail with reference to the accompanying drawings, and regardless of the numbers in the drawings, the same or corresponding elements will be assigned with the same numbers and overlapping descriptions will be omitted.

Figure 2:
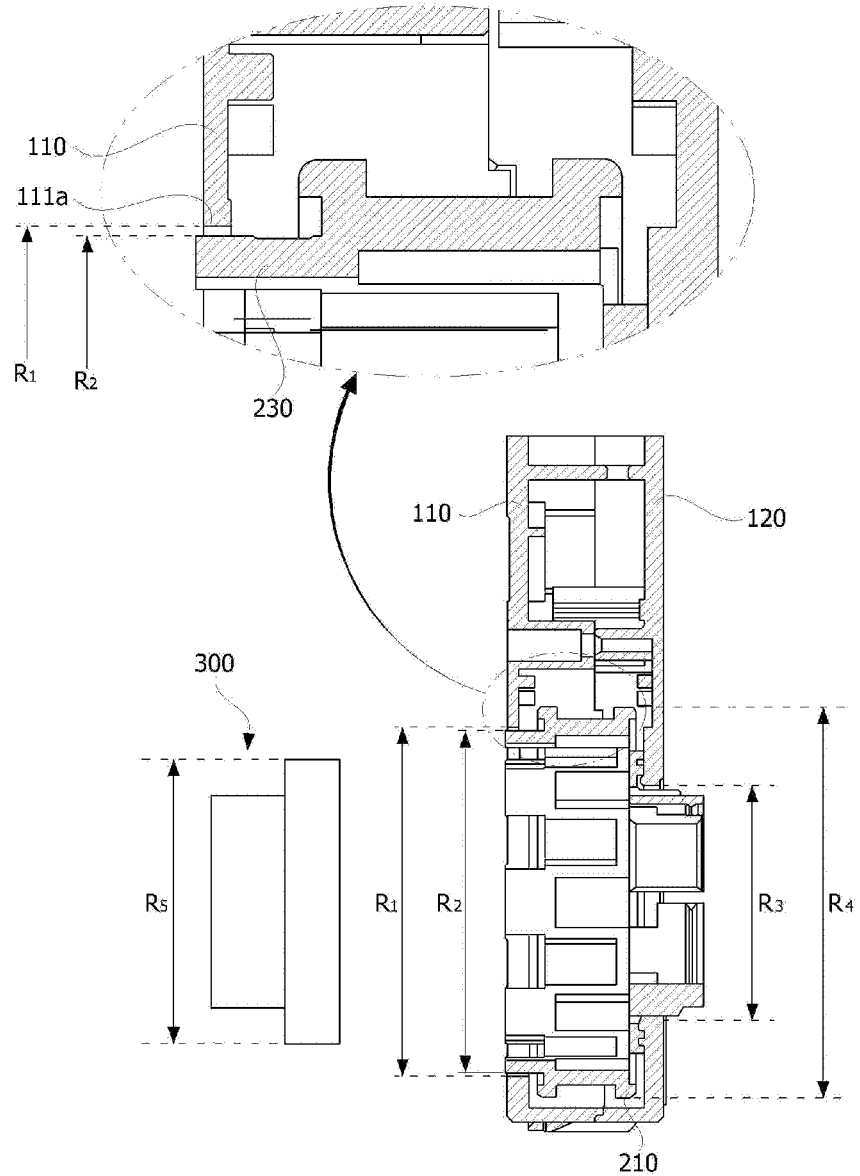
FIG. 2 is a cross-sectional view of a torque sensor according to an embodiment of the present invention.
Figure 3:
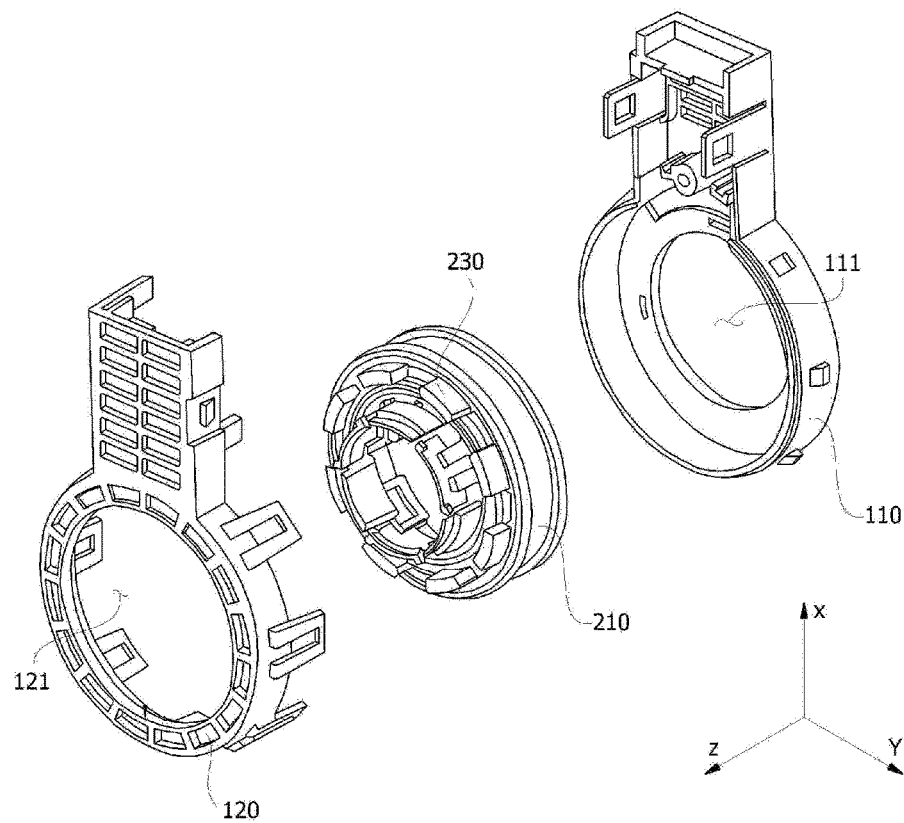
FIG. 3 is an exploded perspective view of a torque sensor according to another embodiment of the present invention.

FIG. 1 is an exploded perspective view of a torque sensor according to an embodiment of the present invention, and FIG. 2 is a cross-sectional view of a torque sensor according to an embodiment of the present invention. Meanwhile, FIG. 3 is an exploded perspective view of a torque sensor according to another embodiment of the present invention.

Referring to FIG. 1 and FIG. 2, the torque sensor according to an embodiment of the present invention includes a first casing 110, a second casing 120, a stator 200, and a rotor 300. Here, the first casing 110 may be an upper casing and the second casing 120 may be a lower casing, but without a strict limitation.

The first casing 110 and the second casing 120 are coupled with each other to form an exterior of the torque sensor, and the stator 200 and the rotor 300 are disposed inside thereof. Here, the first casing 110 and the second casing 120 may be coupled by couplers 112 and 122 formed on one side.

A first opening 111 and a second opening 121 are formed in the first casing 110 and the second casing 120, respectively. An input axis (not shown) is connected to the rotor 300 through the first opening 111 of the first casing 110, and an output axis (not shown) is connected to the stator 200 through the second opening 121 of the second casing 120.

Here, diameters of the first opening 111 and the second opening 121 formed in the first casing 110 and the second casing 120 may be smaller than outer diameter of the stator 200. Accordingly, the stator 200 may be fixed in an axis direction z by coupling the first casing 110 and the second casing 120.

The stator 200 is disposed inside the first casing 110 and the second casing 120 to be rotated with the output axis. The stator 200 includes a stator holder 210 and a stator tooth 220. The stator tooth 220 is formed as a pair (221 and 222), and each is fixed in an upper and a lower portions of the stator holder 210, respectively. The stator tooth 220 is disposed to face a magnet 310 which is disposed on an outer peripheral surface of the rotor 300.

The stator holder 210 forms the body of the stator 200 and is coupled with the output axis. The stator holder 210 may be manufactured by an injection molding process to fix the stator tooth 220. The manner of coupling the stator tooth 220 and the stator holder 210 may have all configurations of a conventional torque sensor applied.

The stator 200 according to the embodiment of the present invention includes a protrusion 230 supported by an inner peripheral surface of the first opening 111 formed in the first casing 110. However, the protrusion 230 is not limited to thereto and may be supported at the second opening 121 formed in the second casing 120.

The protrusion 230 may be formed to protrude in plurality in the axis direction z along a first virtual circle C1. In this case, the diameters of the openings 111 and 121 formed in the first casing 110 and the second casing 120 may be equal to or smaller than a rotational diameter of the protrusion 230 (diameter of the first virtual circle).

The diameters of the first opening 111 and the second opening 121 may be flexibly selected within a tolerance range in which a rotation of the protrusion 230 is supported. For example, when rotated, the protrusion 230 may be in contact with or separated by a certain distance from the inner peripheral surface of the first opening 111.

The rotor 300 is disposed inside the stator 200 and is rotated with the input axis. The magnet 310 in a ring shape is attached on the outer peripheral surface of the rotor 300, and the stator tooth 220 is disposed on an outer surface of the magnet 310.

When a torsion bar is twisted due to a difference between rotation angles of the input axis and the output axis, a rotation angle of the magnet 310 mounted on the rotor 300 become different from that of the stator 200, and thus the surfaces facing each other between the magnet 310 and the stator tooth 220 are relatively moved. Therefore, torque may be measured by detecting a change in magnetization level of the stator 200.

To this end, the torque sensor further includes at least one collector (not shown) which is coupled with the stator tooth 220 to collect magnetic flux, a magnetic device (not shown) to detect the magnetization level collected by the collector, and a circuit board (not shown) in which the magnetic device is disposed Referring to FIG. 2, a diameter R1 of the first opening may be formed to be larger than a diameter R3 of the second opening, and a diameter R2 of the first virtual circle may be equal to or smaller than the diameter R1 of the first opening. In such a configuration, the protrusion 230 disposed along the first virtual circle is disposed to face an inner peripheral surface 111a of the first opening to support rotation of the stator.

Here, since a diameter R4 of an outer peripheral surface of the stator is manufactured to have greater than the diameter R1 of the first opening and the diameter R3 of the second opening, the stator may be securely confined in the first casing 110 and the second casing 120.

Further, the diameter R1 of the first opening may be greater than a diameter R5 of the outer peripheral surface of the rotor 300. In this structure, since the rotor 300 is not confined in the first casing 110 and the second casing 120 and easily separated from the stator, there is an advantage where manufacturing and maintenance are easy. Further, when the torque sensor is mounted on a vehicle, since the rotor 300 and the stator 200 are confined in the axial direction of a steering axis (the input axis and the output axis), performance of the sensor is not lowered.

The protrusion 230 may be formed to protrude from the stator holder 210 or the stator tooth 220. Here, the protrusion 230 is formed in the axis direction z or the lateral directions x and y to be supported by an inner peripheral surface of the first casing 110 or the second casing 120.

In such a configuration, the stator 200 may be fixed in the lateral directions x and y perpendicular to the axis direction z inside the first casing 110 and the second casing 120. That is, since the stator 200 may rotate while being supported by the inner peripheral surface of the first casing 110 or the second casing 120, the stator 200 is prevented from vibrating in the horizontal directions x and y during rotating. Therefore, reliability of the torque sensor operation may be improved.

Referring to FIG. 3, a protrusion 230 may also protrude toward a second casing 120. Therefore, the protrusion 230 may be supported by an inner peripheral surface of a second opening 121.

Figure 4:
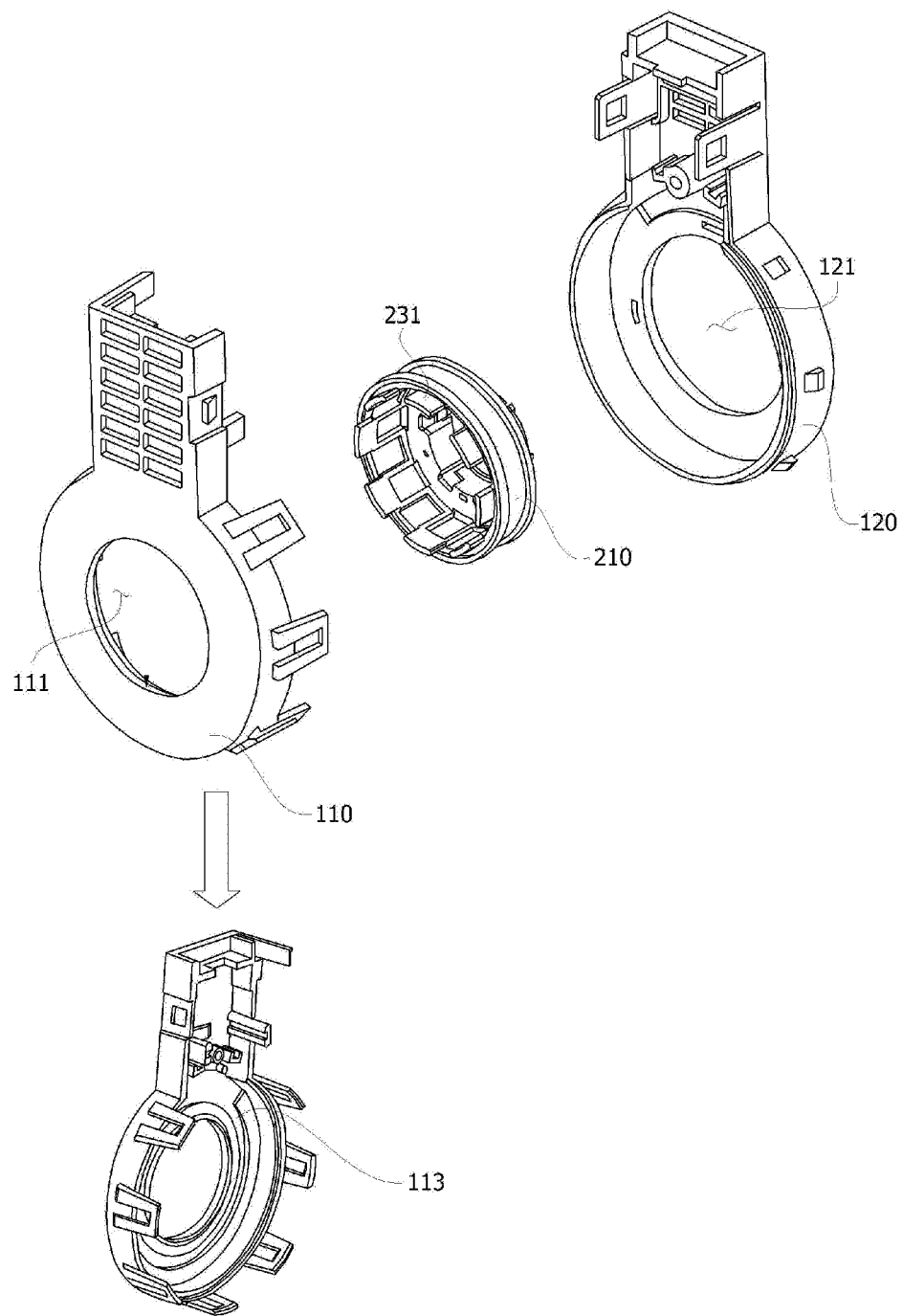
FIG. 4 is an exploded perspective view of a torque sensor according to still another embodiment of the present invention.
Figure 5:
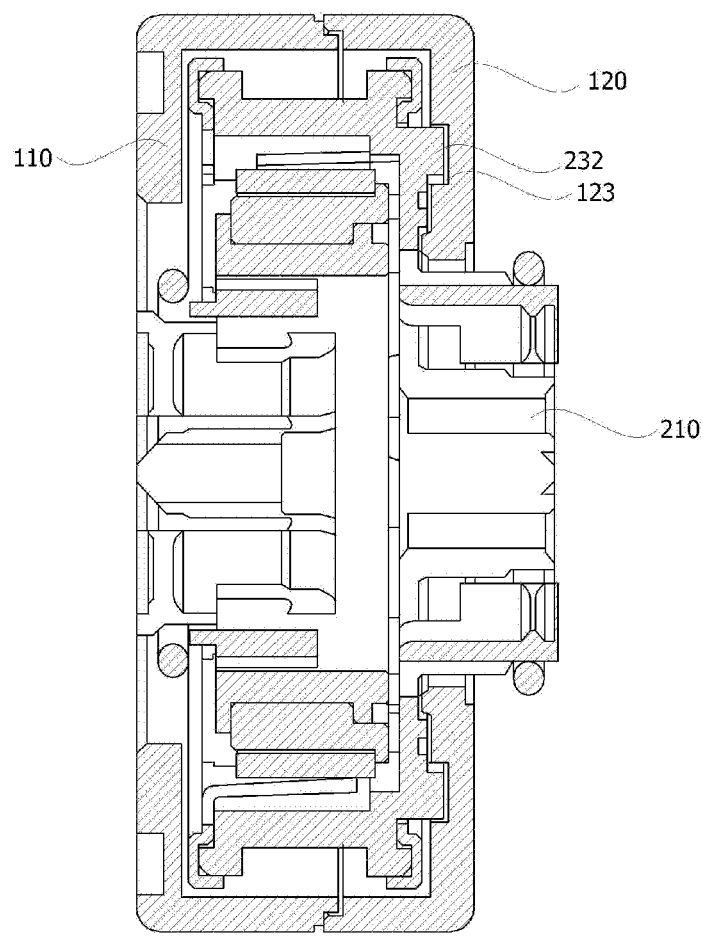
FIG. 5 is a modified example of a torque sensor according to still another embodiment of the present invention.

FIG. 4 is an exploded perspective view of a torque sensor according to still another embodiment of the present invention, and FIG. 5 is a modified example of a torque sensor according to still another embodiment of the present invention.

In the embodiment, configuration of the case and configuration of the protrusion formed in plurality along the first virtual circle are the same as described above, and since only a structure which supports the protrusion is different from the above, the structure will be described in detail.

Referring to FIG. 4, a first guide groove 113 in a ring shaped may be formed on an inner peripheral surface of a first casing 110 to guide rotation of a first protrusion 231, and the first protrusion 231 formed by the stator 200 may be rotatably supported by the first guide groove 113.

Here, the protrusion 231 may be formed to protrude from a stator holder 210 in the axis direction z, and a diameter of an opening 111 formed in the first casing 110 may be smaller than that of a path outlined by rotation of the protrusion 231 (diameter of the first virtual circle).

In such a configuration, since the stator 200 may rotate while being supported by the guide groove 113 formed in the inner peripheral surface of the first casing 110, the stator 200 may be prevented from vibrating in the lateral directions x and y during rotating. Therefore, reliability of the torque sensor operation may be improved.

However, the supporting structure of the protrusion is not necessarily limited to the above. For example, as illustrated in FIG. 5, a second guide groove 123 formed on an inner peripheral surface of a second casing 120 may guide a second protrusion 232.

Further, the first protrusion 231 and the second protrusion 232 may be formed in the stator 200 and configured to be supported by the first guide groove 113 of the first casing 110 and the second guide groove 123 of the second casing 120.

Further, the first protrusion 231 formed in the stator 200 may be disposed to face an inner peripheral surface of the first opening 111 of the first casing 110 (see FIG. 1), and the second protrusion 232 formed in the stator 200 may be disposed to be rotatably coupled to the guide groove 123 formed in the second casing 120. In such a configuration, vibration of the stator in the horizontal direction may be further effectively controlled.

Although exemplary embodiments of the present invention have been referenced and described above, it will be understood that it is possible for those of ordinary skill in the art to implement modifications and variations on the present invention without departing from the concept and scope of the present invention listed in the following appended claims.

What is claimed is:

1. A torque sensing apparatus comprising: a first casing including a first through hole;
a second casing including a second through hole;
a stator disposed between the first casing and the second casing;

a rotor disposed in the stator and including a ring magnet,
wherein the stator includes a stator holder and a stator tooth fixed to the stator holder, wherein the stator tooth is disposed to face outside a peripheral surface of the stator holder,
wherein the stator holder includes a first protrusion disposed through the first through hole,
wherein a diameter of the first protrusion is smaller than a diameter of the first through hole,
wherein the diameter of the first protrusion is larger than a diameter of an outer circumferential surface of the rotor,
wherein the stator holder includes a second protrusion protruded toward the second casing,
wherein the second casing includes a groove formed on an inner peripheral surface of the second casing, and
wherein the second protrusion is coupled to the groove.

2. The torque sensing apparatus of claim 1, wherein the first protrusion includes a plurality of first sub-protrusions and the second protrusion includes a plurality of second sub-protrusions.

3. The torque sensing apparatus of claim 1, wherein the first protrusion protrudes from the stator holder in an axis direction.

4. The torque sensing apparatus of claim 1, comprising:
a collector connected to the stator tooth; and
a magnetic device configured to detect a magnetization level collected by the collector.

5. A torque sensing apparatus comprising:
a first casing including a first through hole;
a second casing including a second through hole;
a stator disposed between the first casing and the second casing; and
a rotor disposed in the stator and including a ring magnet,
wherein the stator includes a stator holder and a stator tooth fixed to the stator holder,
wherein the stator tooth is disposed to face outside a peripheral surface of the stator holder,
wherein the stator holder includes a first protrusion protruded toward the first casing,
wherein the first easing includes a first groove formed on an inner peripheral surface of the first casing,
wherein the first protrusion is coupled to the first groove,
wherein the stator holder includes a second protrusion protruded toward the second casing,
wherein the second casing includes a second groove formed on an inner peripheral surface of the second casing, and
wherein the second protrusion is coupled to the second groove.

6. The torque sensing apparatus of claim 5, wherein the first protrusion includes a plurality of first sub-protrusions and the second protrusion includes a plurality of second sub-protrusions.

7. The torque sensing apparatus of claim 2, wherein the first protrusion protrudes from the stator holder in an axis direction.

8. The torque sensing apparatus of claim 5, further comprising:
a collector connected to the stator tooth; and
a magnetic device configured to detect a magnetization level collected by the collector.

* * * * *